(12) United States Patent
Harada et al.

(10) Patent No.: US 11,488,097 B2
(45) Date of Patent: Nov. 1, 2022

(54) PICKUP REQUEST SYSTEM AND PICKUP REQUEST METHOD

(71) Applicant: Panasonic Intellectual Property Management Co., Ltd., Osaka (JP)

(72) Inventors: Kumi Harada, Osaka (JP); Keiichi Tanaka, Osaka (JP); Makoto Hiroki, Osaka (JP); Keiji Sakaguchi, Osaka (JP); Norikazu Tagaki, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 159 days.

(21) Appl. No.: 16/972,352

(22) PCT Filed: Apr. 25, 2019

(86) PCT No.: PCT/JP2019/017556
§ 371 (c)(1),
(2) Date: Dec. 4, 2020

(87) PCT Pub. No.: WO2019/239731
PCT Pub. Date: Dec. 19, 2019

(65) Prior Publication Data
US 2021/0233020 A1 Jul. 29, 2021

(30) Foreign Application Priority Data
Jun. 13, 2018 (JP) .............................. JP2018-112423

(51) Int. Cl.
*G06Q 10/08* (2012.01)
*H04W 4/029* (2018.01)
*H04W 4/021* (2018.01)

(52) U.S. Cl.
CPC ........ *G06Q 10/0836* (2013.01); *H04W 4/022* (2013.01); *H04W 4/029* (2018.02)

(58) Field of Classification Search
CPC ... G06Q 10/0836; H04W 4/029; H04W 4/022
USPC ...................................... 455/456.2
See application file for complete search history.

(56) References Cited

U.S. PATENT DOCUMENTS

| | | | |
|---|---|---|---|
| 2004/0243426 A1 | 12/2004 | Hashimoto | |
| 2017/0092102 A1* | 3/2017 | Fusakawa | .............. G06Q 50/06 |
| 2017/0245114 A1* | 8/2017 | Bessho | ................. H04W 4/029 |

FOREIGN PATENT DOCUMENTS

| | | |
|---|---|---|
| JP | 2002-322845 A | 11/2002 |
| JP | 2008-49044 A | 3/2008 |

OTHER PUBLICATIONS

International Search Report and Written Opinion for corresponding Application No. PCT/JP2019/017556, dated Jul. 23, 2019.

* cited by examiner

*Primary Examiner* — Ted M Wang
(74) *Attorney, Agent, or Firm* — Renner, Otto, Boisselle & Sklar, LLP

(57) ABSTRACT

A pickup request system includes: a determination unit configured to determine presence or absence of a package in a delivery box provided on a site of a building and whether or not a user is present in a first predetermined range including the building; and a control unit configured to request pickup of the package when it is determined that the user has moved from within the first predetermined range to out of the first predetermined range while the package is present in the delivery box.

11 Claims, 9 Drawing Sheets

PICKUP REQUEST SYSTEM AND PICKUP REQUEST METHOD

TECHNICAL FIELD

The present invention relates to a pickup request system and a pickup request method.

BACKGROUND ART

The number of courier services handled has rapidly increased following an increase in mail-order services of products in recent years, which has brought about a social problem such that redelivery is required due to the absence of recipients. It is possible to consider measures against such a problem for providing a delivery locker (hereinafter also described as a delivery box) in which delivery staff of a courier can deposit a package when a recipient is absent. Patent Literature (PTL) 1 discloses a delivery locker system.

CITATION LIST

Patent Literature

PTL 1: Japanese Unexamined Patent Application Publication No. 2008-49044.

SUMMARY OF THE INVENTION

Technical Problem

The present invention provides a pickup request system and a pickup request method capable of requesting package pickup by use of a delivery box.

Solutions to Problem

A pickup request system according to one aspect of the present invention includes: a determination unit configured to determine presence or absence of a package in a delivery box provided on a site of a building and whether or not a user is present in a first predetermined range including the building; and a control unit configured to request pickup of the package when it is determined that the user has moved from within the first predetermined range to out of the first predetermined range while the package is present in the delivery box.

A pickup request method according to another aspect of the present invention is executed by a computer and includes: determining presence or absence of a package in a delivery box provided on a site of a building and whether or not a user is present in the building; and requesting pickup of the package when it is determined that a change from presence of the user to absence of the user has occurred while the package is present in the delivery box.

A recording medium according to still another aspect of the present invention is a computer-readable, non-transitory recording medium on which a program for causing a computer to execute the pickup request method described above is recorded.

Advantageous Effect of Invention

According to the present invention, it is possible to realize a pickup request system and a pickup request method capable of requesting package pickup by use of a delivery box.

DESCRIPTION OF EXEMPLARY EMBODIMENTS

Figure 1:
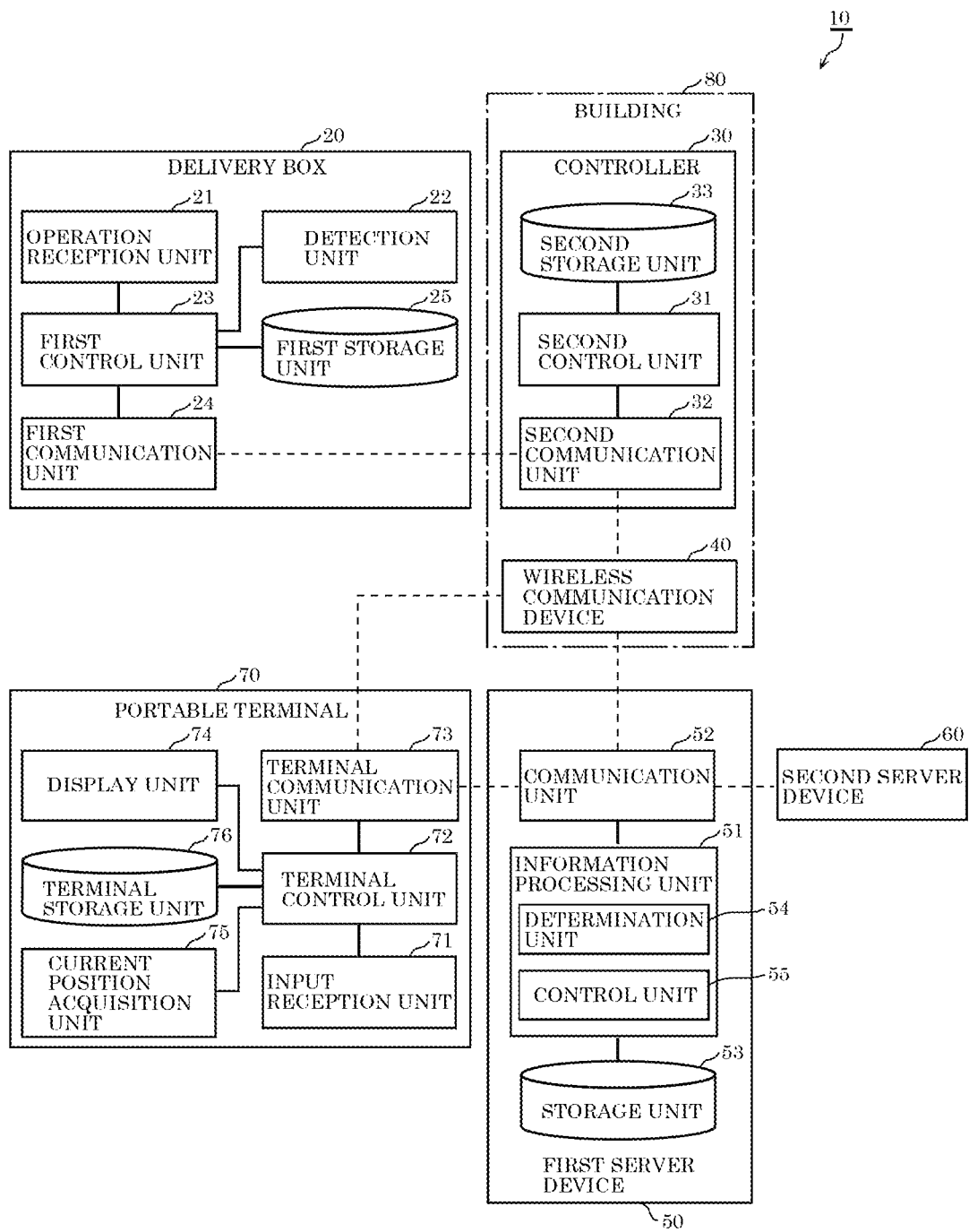
FIG. 1 is a block diagram illustrating a functional configuration of a pickup request system according to Embodiment 1.

Hereinafter, the embodiments will be described in detail with reference to the drawings. Note that each embodiment described below illustrates a comprehensive or detailed example. Numerical values, shapes, materials, components, arrangement and connection modes of the components, steps, and a sequence of the steps, etc., illustrated in the embodiments below each form one example and are not intended to limit the present invention. Moreover, of the components in the embodiments described below, those not disclosed in an independent claim will be described as optional components.

Note that each drawing is a schematic diagram and does not necessarily provide a precise illustration. Moreover, for example, substantially same configurations are provided with same sings in the drawings and overlapping explanation will be omitted or simplified.

Embodiment 1

[Configuration]

First, the configuration of a pickup request system according to Embodiment 1 will be described. FIG. 1 is a block diagram illustrating a functional configuration of the pickup request system according to Embodiment 1.

Pickup request system 10 according to Embodiment 1 is a system for automatically requesting package pickup (hereinafter also described as pickup request operation) by use of delivery box 20 which is used by delivery staff of a courier to deposit a package when a recipient of the package is absent. Pickup request system 10 includes delivery box 20, controller 30, wireless communication device 40, first server device 50, second server device 60, and portable terminal 70. Hereinafter, a configuration of each of devices forming pickup request system 10 will be described in detail.

[Delivery Box]

Delivery box 20 is a device for delivery staff of a courier to deposit a package addressed to a user when the user is absent in building 80. Hereinafter, the description will be given under the assumption that building 80 is user's home. Building 80 is, for example, a detached house but may be any other type of building. In other words, delivery box 20 is a delivery locker. Delivery box 20 is provided on a site of building 80. That is, delivery box 20 may be provided in building 80 or may be provided outside of building 80 but around building 80. With delivery box 20, the occurrence of package redelivery can be suppressed. Delivery box 20 includes operation reception unit 21, detection unit 22, first control unit 23, first communication unit 24, and first storage unit 25.

Operation reception unit 21 is a user interface which receives operation performed by a user or delivery staff of a courier. Operation reception unit 21 is, for example, a hardware key (in other words, a hardware button) which receives, for example, operation of opening or locking the door of delivery box 20, but may also be, for example, a touch panel.

Detection unit 22 detects the presence or absence of a package in delivery box 20. Detection unit 22 may be, for example, a magnetic sensor (that is, a magnet sensor) but may also be an optical sensor.

First control unit 23 performs control related to delivery box 20 in accordance with operation received by operation reception unit 21 or a result of detection performed by detection unit 22. First control unit 23 is realized by, for example, a microcomputer but may also be realized by a processor or a dedicated circuit.

First communication unit 24 is a communication circuit for delivery box 20 to perform communication with controller 30. First communication unit 24 performs wireless communication with controller 30 but may also perform wired communication therewith. Communication standards for communication performed by first communication unit 24 are not specifically limited.

First storage unit 25 is a storage device which stores, for example, a control program executed by first control unit 23. First storage unit 25 is realized by, for example, a semiconductor memory.

[Controller and Wireless Communication Device]

Controller 30 is a so-called home energy management system (HEMS) controller, which is provided on a site of building 80 and performs, for example, control of home appliances provided on the site of building 80 and management of power consumption of the home appliances provided on the site of building 80. Controller 30 includes second control unit 31, second communication unit 32, and second storage unit 33.

Second control unit 31 performs control related to controller 30. Second control unit 31 is realized by, for example, a microcomputer but may also be realized by a processor or a dedicated circuit.

Second communication unit 32 is a communication circuit for controller 30 to perform communication with delivery box 20 and wireless communication device 40. Second communication unit 32 performs wireless communication with delivery box 20 but may also perform wired communication therewith. Moreover, second communication unit 32 performs wireless communication with wireless communication device 40. Communication standards for communication performed by second communication unit 32 are not specifically limited.

Second storage unit 33 is a storage device which stores, for example, a control program executed by second control unit 31. Second storage unit 33 is realized by, for example, a semiconductor memory.

Wireless communication device 40 is a wireless local area network (LAN) rooter, which is provided in building 80. Wireless communication device 40 is connected with controller 30 through communication. Moreover, upon entrance of portable terminal 70 into a communicable range of wireless communication device 40, portable terminal 70 is connected with wireless communication device 40 through communication.

[First Server Service and Second Server Device]

First server device 50 performs various types of information processing related to pickup request operation. First server device 50 transmits, for example, pickup request information for requesting pickup to second server device 60. First server device 50 is provided by, for example, a manufacturer of delivery box 20 or controller 30. First server device 50 includes information processing unit 51, communication unit 52, and storage unit 53.

Information processing unit 51 performs information processing related to the pickup request operation. Information processing unit 51 includes determination unit 54 and control unit 55. Information processing unit 51 is realized by, for example, a microcomputer but may also be realized by a processor or a dedicated circuit.

Communication unit 52 is a communication circuit for first server device 50 to perform communication with wireless communication device 40 and portable terminal 70. Communication standards for communication performed by communication unit 52 are not specifically limited.

Storage unit 53 is a storage device which stores, for example, a control program executed by information processing unit 51. Storage unit 53 is realized by, for example, a semiconductor memory.

Second server device 60 receives the pickup request information from first server device 50 and manages the received pickup request information. Second server device 60 is provided by a courier. Second server device 60 performs information processing for arranging the pickup.

[Portable Terminal]

Portable terminal 70 is a portable information terminal, such as a smartphone or a tablet terminal, which is possessed by a user. Portable terminal 70 includes input reception unit 71, terminal control unit 72, terminal communication unit 73, display unit 74, current position acquisition unit 75, and terminal storage unit 76.

Input reception unit 71 receives user input. Input reception unit 71 is realized by, for example, a touch panel or a hardware button.

Terminal control unit 72 performs various types of information processing related to portable terminal 70 based on, for example, the input received by input reception unit 71. Terminal control unit 72 is realized by, for example, a microcomputer but may also be realized by a processor or a dedicated circuit.

Terminal communication unit 73 is a communication circuit for portable terminal 70 to perform communication with wireless communication device 40 or first server device 50. Terminal communication unit 73 performs, for example, short-range wireless communication with wireless communication device 40 and performs wireless communication with first server device 50 via a mobile communication network. Communication standards for wireless communication performed by terminal communication unit 73 are not specifically limited.

Display unit 74 displays a display screen based on control performed by terminal control unit 72. More specifically, display unit 74 is a display which includes a liquid crystal panel or an organic electro luminescence (EL) panel as a display device.

Current position acquisition unit 75 acquires the current position of portable terminal 70 and outputs current position information indicating the acquired current position to terminal control unit 72. Current position acquisition unit 75 is realized by, for example, a global positioning system (GPS) module.

Terminal storage unit 76 is a storage device which stores, for example, a control program executed by terminal control unit 72. Terminal storage unit 76 is realized by, for example, a semiconductor memory.

Operation Example 1

Figure 2:
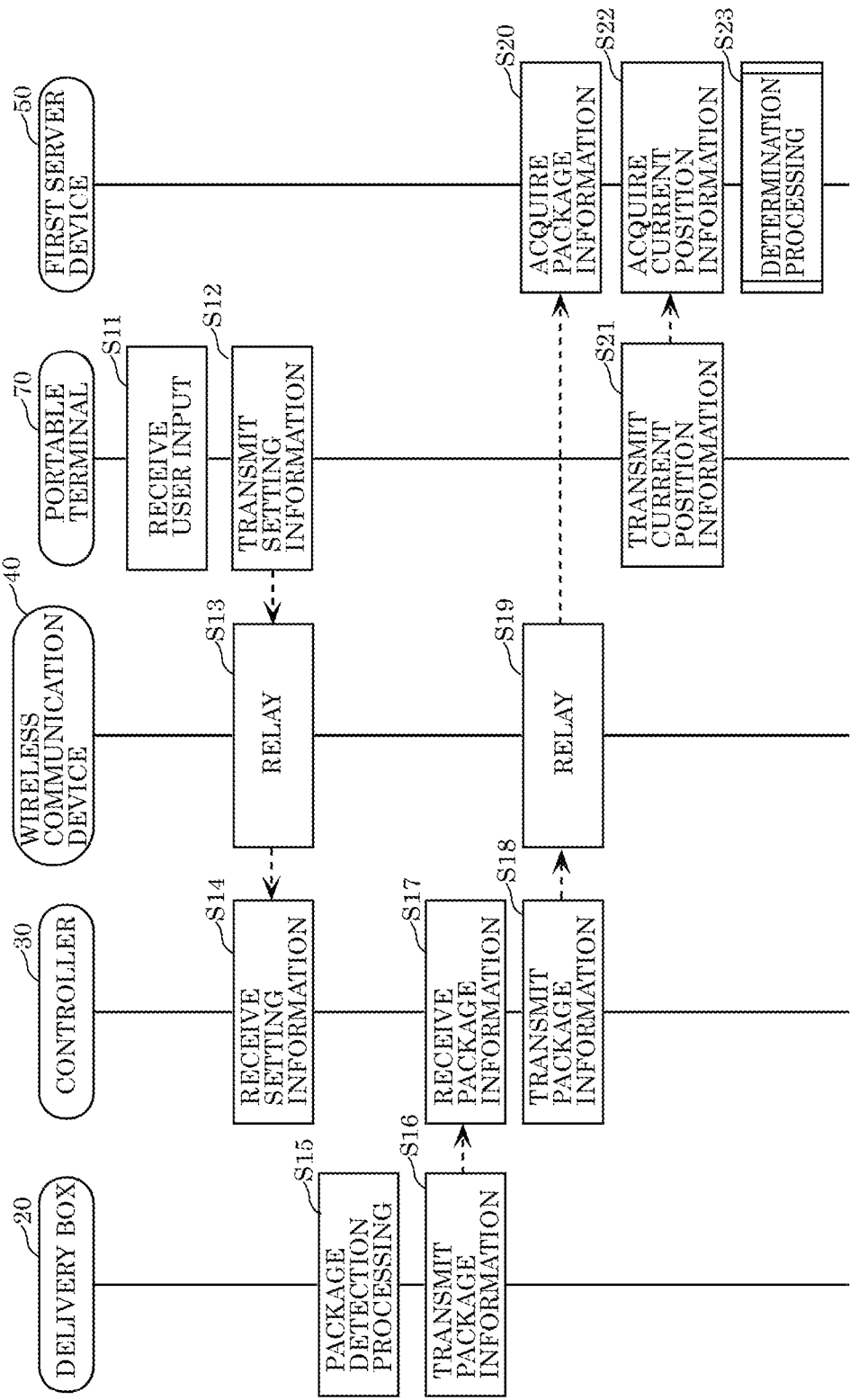
FIG. 2 is a sequence diagram of Operation Example 1 of the pickup request system according to Embodiment 1.

Next, Operation Example 1 of pickup request system 10 will be described. FIG. 2 is a sequence diagram of Operation Example 1 of pickup request system 10.

Figure 3:
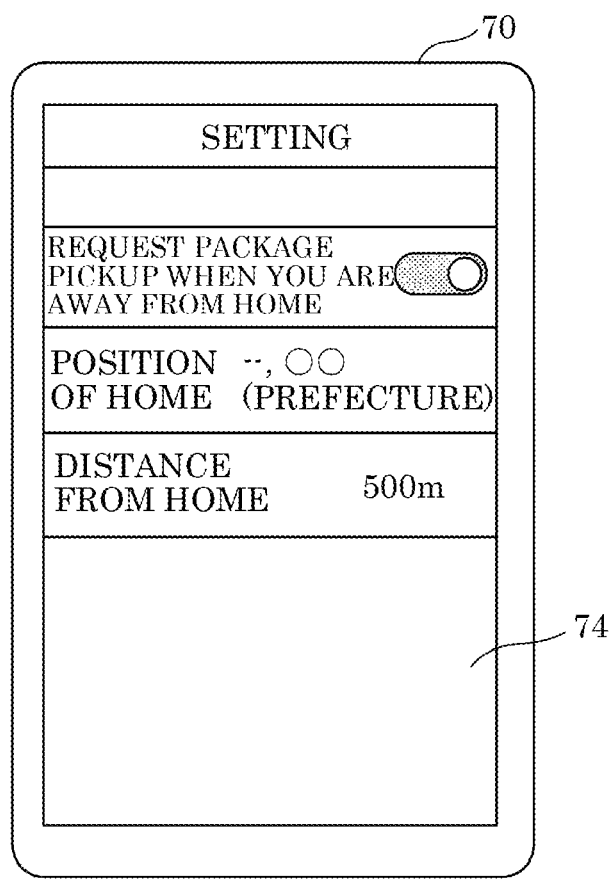
FIG. 3 illustrates one example of an input screen for a user to instruct an automatic pickup mode.

First, input reception unit 71 of portable terminal 70 receives user input instructing an automatic pickup mode (S11). Display unit 74 of portable terminal 70 displays an input screen as illustrated in FIG. 3 in step S11. FIG. 3 illustrates one example of the input screen for the user to instruct the automatic pickup mode. Terminal control unit 72 is set to the automatic pickup mode based on the user input which instructs the automatic pickup mode and has been received by input reception unit 71. Moreover, terminal control unit 72 causes terminal communication unit 73 to transmit setting information (S12). The setting information transmitted by terminal communication unit 73 is relayed by wireless communication device 40 (S13) and received by second communication unit 32 of controller 30 (S14). Note that when portable terminal 70 is located outside of a communicable range of wireless communication device 40, the setting information is received by second communication unit 32 not via wireless communication device 40 but via the mobile communication network. Upon the reception of the setting information by second communication unit 32, second control unit 31 is set to the automatic pickup mode.

On the other hand, first control unit 23 of delivery box 20 performs processing of detecting the presence or absence of a package in delivery box 20 by use of detection unit 22 (S15), and causes first communication unit 24 to transmit package information indicating the presence or absence of the package in delivery box 20 (S16). Note that it is not necessary that the package information be transmitted in accordance with a result of the detection performed by detection unit 22. For example, the package information may be transmitted in response to a press of a button included in delivery box 20. The button in this case is, for example, a pickup request button and the pickup request button is included in operation reception unit 21.

Second communication unit 32 of controller 30 receives the package information from first communication unit 24 (S17). Second control unit 31 here causes second communication unit 32 to transmit the received package information when the automatic pickup mode is set (S18). The package information transmitted by second communication unit 32 is relayed by wireless communication device 40 (S19) and acquired by communication unit 52 of first server device 50 (S20).

Moreover, terminal control unit 72 of portable terminal 70 set to the automatic pickup mode causes terminal communication unit 73 to transmit the current position information (S21). The current position information is acquired by current position acquisition unit 75 and regularly transmitted at, for example, predetermined time intervals. The current position information transmitted by terminal communication unit 73 is acquired by communication unit 52 of first server device 50 (S22).

Figure 4:
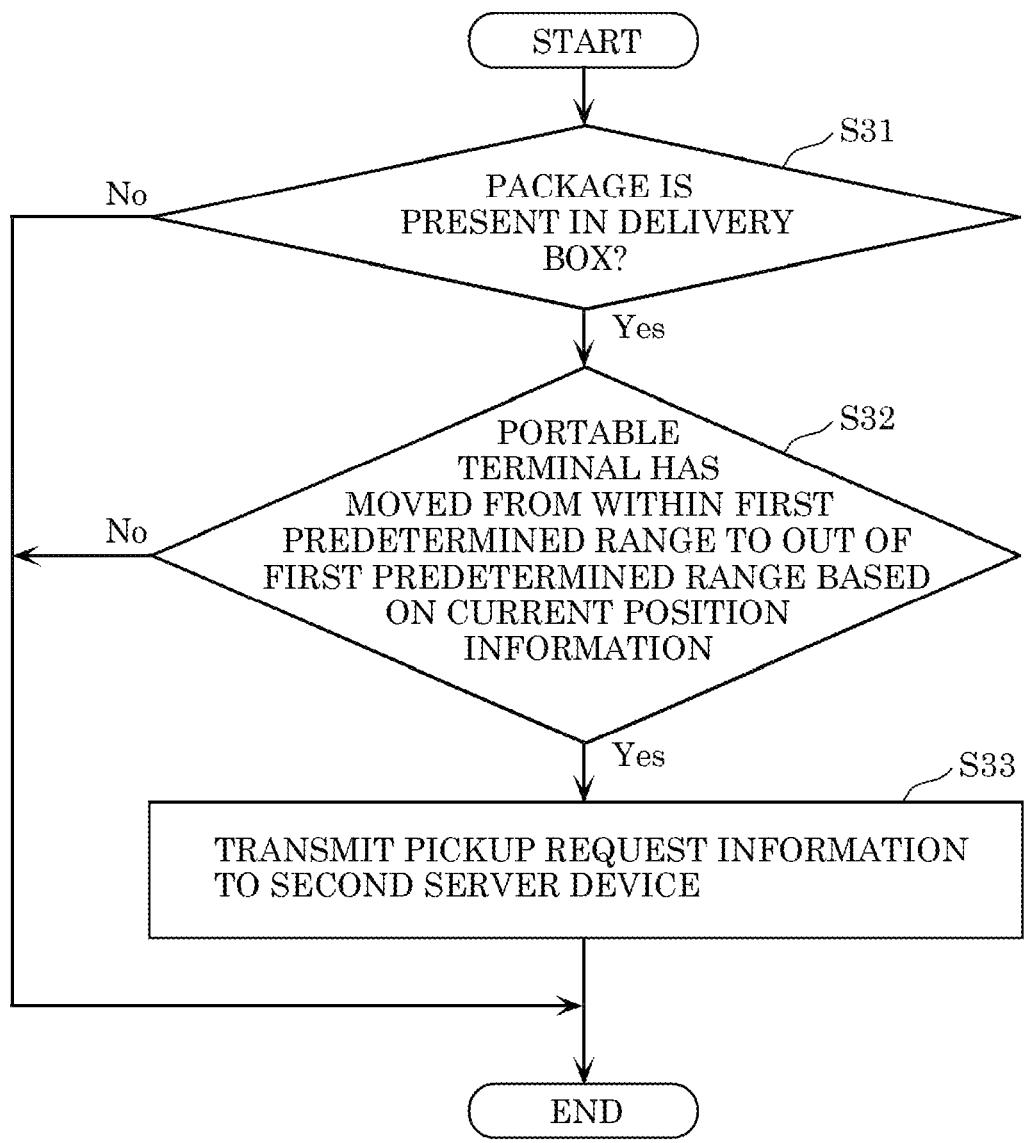
FIG. 4 is a flowchart of determination processing according to Operation Example 1.

Information processing unit 51 of first server device 50 performs determination processing according to Operation Example 1 based on the package information acquired in step S20 and the current position information acquired in step S22 (S23). FIG. 4 is a flowchart of the determination processing according to Operation Example 1.

First, determination unit 54 of information processing unit 51 determines the presence or absence of the package in delivery box 20 based on the acquired package information (S31). When it is determined that the package is present (Yes in S31), determination unit 54 determines, based on the acquired current position information, whether or not portable terminal 70 of the user has moved from within a first predetermined range including at least part of building 80 to out of the first predetermined range (S32). Specifically, determination unit 54 determines, based on the position of portable terminal 70 possessed by the user, whether or not the user has moved from within the first predetermined range to out of the first predetermined range. The first predetermined range is, for example, a range of a predetermined distance relative to the position of building 80 (in other words, user's home) as a center. Note that the position and the distance of building 80 are changeable through the input screen of FIG. 3.

When it is determined by determination unit 54 that portable terminal 70 has moved from within the first predetermined range to out of the first predetermined range (Yes in S32), it may be presumed in some cases that the user who was present in building 80 is no longer present. Thus, control unit 55 transmits the pickup request information of the package in delivery box 20 to second server device 60 in such cases (S33). The pickup request information includes personal information, such as an address (that is, a pickup location), name, and phone number of the user, which are required for package delivery. The aforementioned personal information is previously stored in storage unit 53 through, for example, user registration.

When it is determined in step S31 that the package is absent (No in S31) and also when it is not determined in step S32 that portable terminal 70 has moved from within the first predetermined range to out of the first predetermined range (No in S32), the pickup request information is not transmitted.

As described above, pickup request system 10 requests pick up of the package when it is determined that the user has moved from within the first predetermined range to out of the first predetermined range while the package is present in delivery box 20. Such pickup request system 10 can automatically request the pickup of the package under the assumption that the user is no longer present in building 80.

Figure 5:
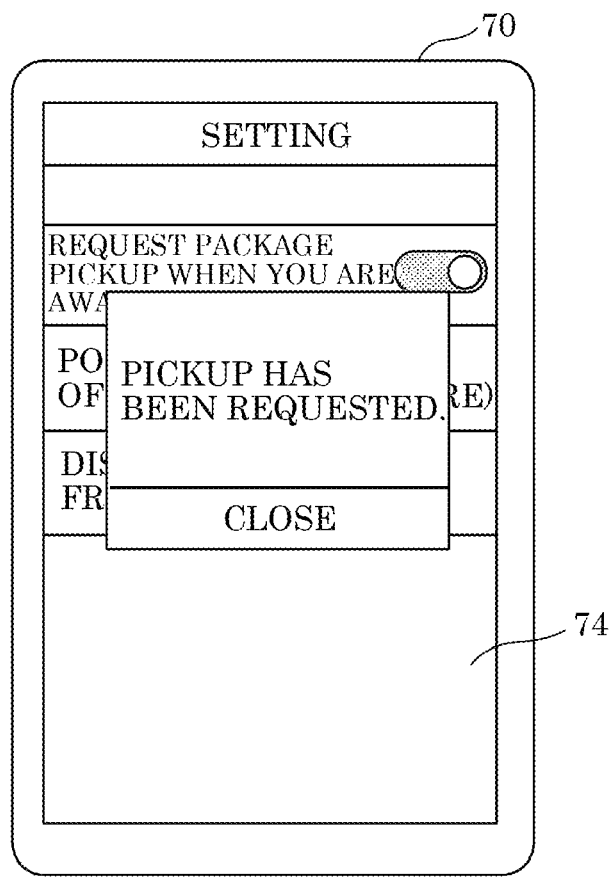
FIG. 5 is a diagram illustrating one example of a display screen notifying that pickup has been requested.

Note that when the pickup has been requested, this may be notified to portable terminal 70. Specifically, control unit 55 may provide notification to communication unit 52. In this case, display unit 74 of portable terminal 70 displays a display screen, as illustrated in FIG. 5, notifying that the pickup has been requested. FIG. 5 is a diagram illustrating one example of the display screen notifying that the pickup has been requested. The notification that the pickup has been requested is, for example, a push notification Operation Example 2

Figure 6:
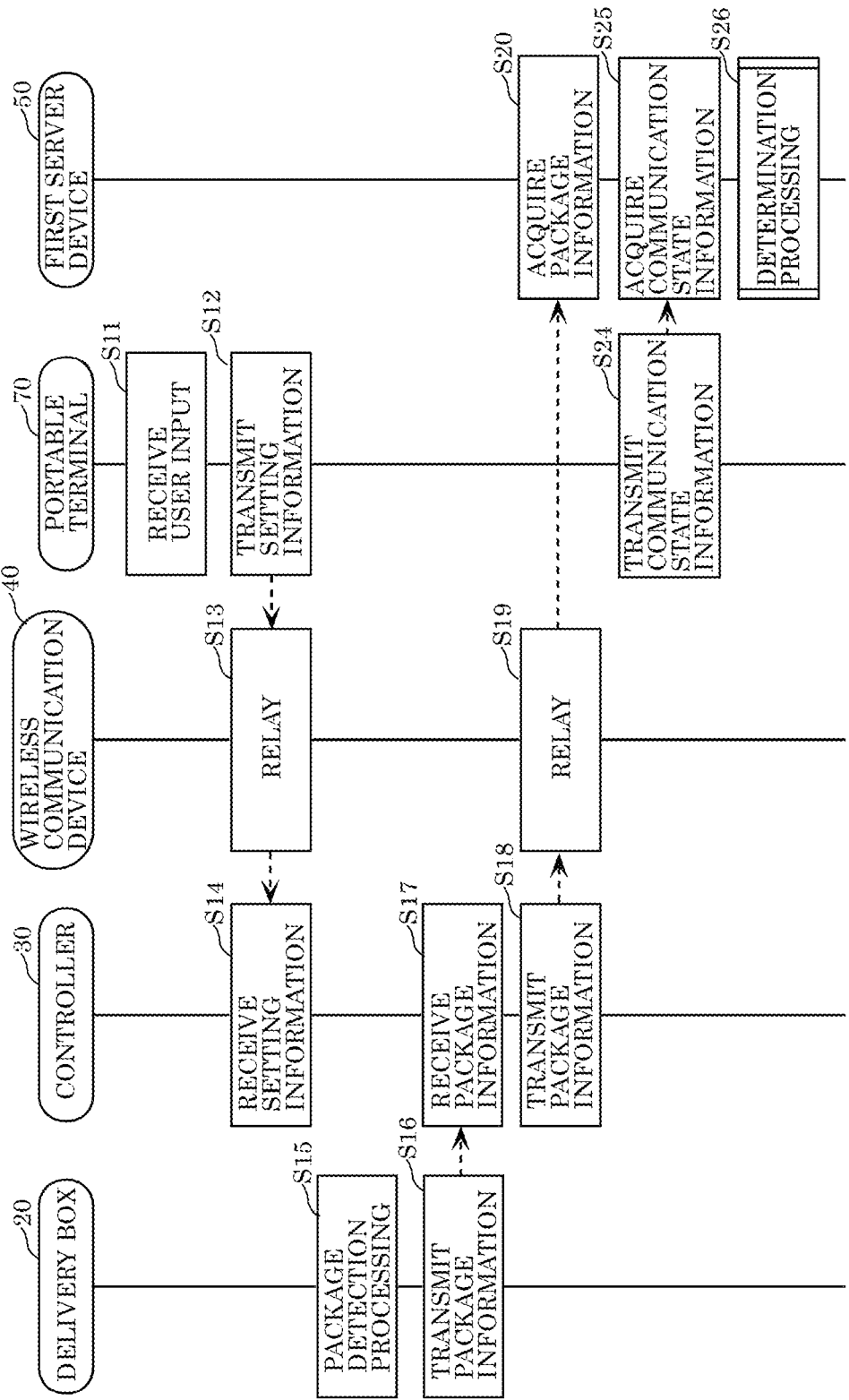
FIG. 6 is a sequence diagram of Operation Example 2 of the pickup request system according to Embodiment 1.

A method for determining that portable terminal 70 has moved from within the first predetermined range to out of the first predetermined range is not limited to the method using the current position information of portable terminal 70. For example, terminal communication unit 73 of portable terminal 70 has the function of, upon entrance to the communicable range of wireless communication device 40 during the wireless communication performed by using the mobile communication network, switching the wireless communication to short-range wireless communication with wireless communication device 40. It may be determined by use of such a switching function that portable terminal 70 has moved from within the first predetermined range to out of the first predetermined range. FIG. 6 is a sequence diagram of Operation Example 2 of pickup request system 10 as described above.

In Operation Example 2, steps S24 to S26 are provided instead of steps S21 to S23 of Operation Example 1. Terminal control unit 72 of portable terminal 70 set to the automatic pickup mode causes terminal communication unit 73 to transmit communication state information (S24). The communication state information indicates whether terminal communication unit 73 performs wireless communication by use of the mobile communication network or performs short-range wireless communication with wireless communication device 40. The communication state information is regularly transmitted at, for example, predetermined time intervals. The communication state information transmitted by terminal communication unit 73 is acquired by communication unit 52 of first server device 50 (S25).

Figure 7:
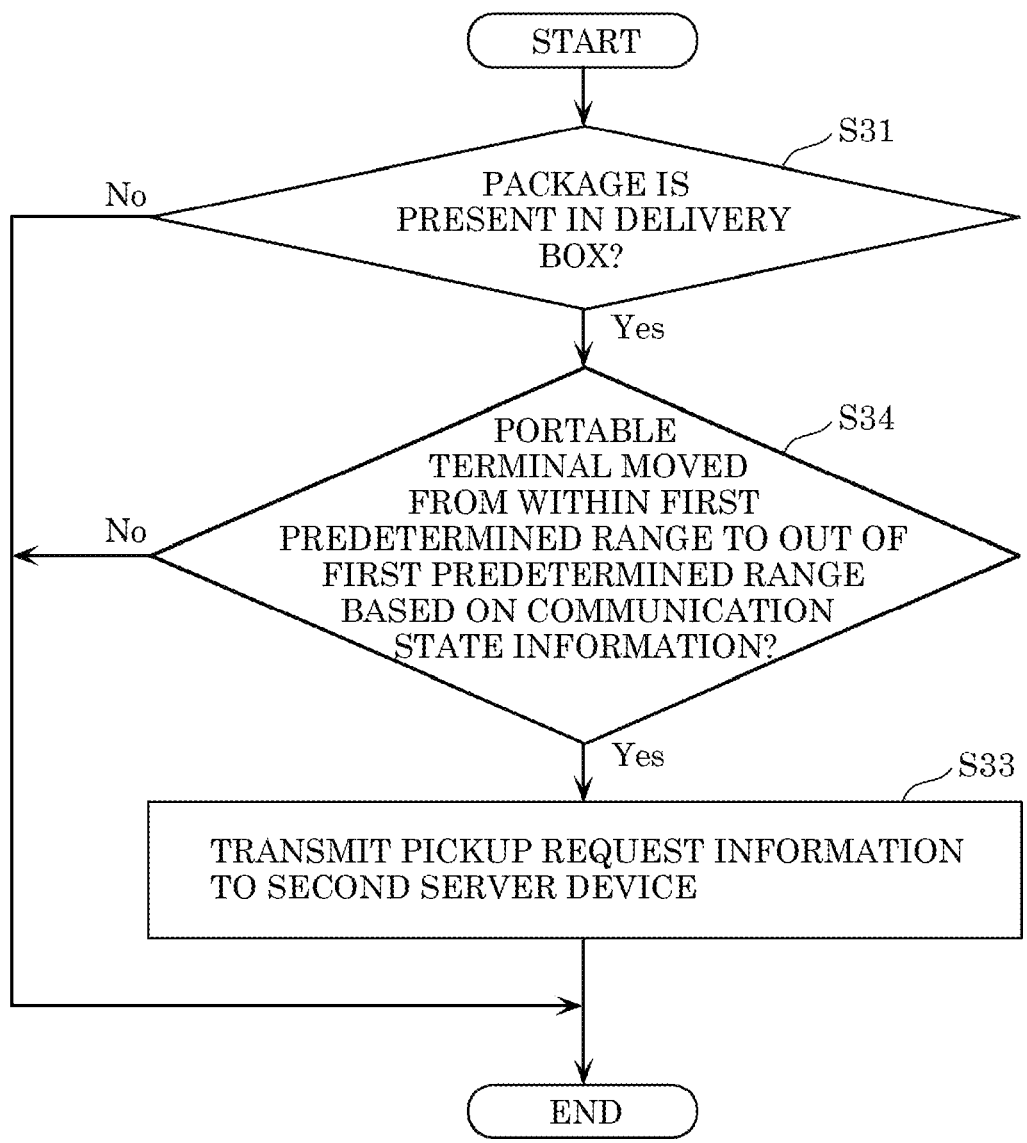
FIG. 7 is a flowchart of determination processing according to Operation Example 2.

Information processing unit 51 of first server device 50 performs determination processing according to Operation Example 2 based on the package information acquired in step S20 and the communication state information acquired in step S24 (S26). FIG. 7 is a flowchart of the determination processing according to Operation Example 2.

First, determination unit 54 of information processing unit 51 determines, based on the acquired package information, whether the package is present or absent in delivery box 20 (S31). When it is determined that the package is present (Yes in S31), determination unit 54 determines, based on the acquired communication state information, whether or not portable terminal 70 of the user has moved from within the first predetermined range to out of the first predetermined range (S34). The first predetermined range here is described as a range where wireless communication device 40 is capable of wireless communication (also simply described as a communication range or a communicable range).

When it is determined by determination unit 54 that portable terminal 70 has moved from within the first predetermined range to out of the first predetermined range (Yes in S34), it may be presumed in some cases that the user is no longer present in building 80. Thus, control unit 55 transmits the pickup request information of the package in delivery box 20 to second server device 60 in such cases (S33).

The pickup request information is not transmitted when it is determined in step S31 that the package is absent (No in S31) or when it is not determined in step S34 that portable terminal 70 has moved from within the first predetermined range to out of the first predetermined range (No in S34).

As described above, when it is determined that the user has moved from within the first predetermined range to out of the first predetermined range while the package is present in delivery box 20, pickup request system 10 requests pick up of the package even in Operation Example 2. Such pickup request system 10 can automatically request the pickup of the package under the assumption that the user is no longer present.

Variations

A method for determining whether or not the user has moved from within the first predetermined range to out of the first predetermined range is not limited to the method using portable terminal 70 as in Operation Examples 1 and 2. As described above, controller 30 is the HEMS controller, which manages the power consumption of the home appliances provided on the site of building 80. Thus, when total power consumption in building 80 is relatively great, it is assumed that the user is present in building 80. When the total power consumption in building 80 is relatively small, it is assumed that the user is absent in building 80. Therefore, first server device 50 acquires, from controller 30, power consumption information indicating the total power consumption in building 80 to thereby determine, based on the acquired power consumption information, whether or not the user is present in building 80.

In addition, it is possible to provide, in building 80, a pyroelectric infrared sensor (in other words, motion sensor) which detects infrared rays emitted from the human body, and it is also possible to determine, based on a result of the detection performed by such a pyroelectric infrared sensor, whether or not the user has moved from within the first predetermined range to out of the first predetermined range. Moreover, it is also possible to determine, based on a lock state of the door provided in building 80, whether or not the user has moved from within the first predetermined range to out of the first predetermined range.

Moreover, it is possible that delivery box 20 is shared by a plurality of users. More specifically, delivery box 20 may be installed in a housing complex in some cases. In such cases, for example, operation reception unit 21 of delivery box 20 can receive input operation of a room number from the user whereby delivery box 20 can acquire room number information. If such room number information is transmitted to first server device 50, first server device 50 can specify a user (more specifically portable terminal 70 of the aforementioned user) targeted for the determination processing. In this case, for example, the room number of the user and the ID of portable terminal 70 of the user are previously stored in storage unit 53 through, for example, user registration.

Effects

As described above, pickup request system 10 includes: determination unit 54 which determines the presence or absence of the package in delivery box 20 provided on the site of building 80 and whether or not the user is present within the first predetermined range including at least part of building 80; and control unit 55 which requests pick up of the package when it is determined that the user has moved from within the first predetermined range to out of the first predetermined range while the package is present in delivery box 20.

Such pickup request system 10 can request the pickup by use of delivery box 20. More specifically, pickup request system 10 can request pickup of the package when the user has gone out from building 80 after placing, into delivery box 20, a package to be picked up. In other words, pickup request system 10 permits the user to place, into delivery box 20, the package to be picked up before going out from building 80 to thereby easily request the pickup.

Moreover, for example, determination unit 54 determines, based on the position of portable terminal 70 of the user, whether or not the user has moved from within the first predetermined range to out of the first predetermined range.

Such pickup request system 10 can determine, based on a change in the position of portable terminal 70, that the user has moved from within the first predetermined range to out of the first predetermined range.

Moreover, for example, pickup request system 10 further includes communication unit 52 which acquires current position information of portable terminal 70 from portable terminal 70. Communication unit 52 is one example of an acquisition unit. Determination unit 54 determines, based on the acquired current position information, whether or not portable terminal 70 has moved from within the first predetermined range to out of the first predetermined range.

Such pickup request system 10 can determine the change in the position of portable terminal 70 based on the current position information acquired from portable terminal 70.

Moreover, for example, the first predetermined range is a range where wireless communication device 40 provided in building 80 is capable of wireless communication. Determination unit 54 determines, based on a state of communication connection of portable terminal 70 and wireless communication device 40, whether or not portable terminal 70 has moved from within the first predetermined range to out of the first predetermined range.

Such pickup request system 10 can determine the change in the position of portable terminal 70 based on the state of communication connection of portable terminal 70 and wireless communication device 40. Moreover, for example, pickup request system 10 further includes communication unit 52 which acquires, from portable terminal 70, the communication connection information indicating the state of the communication connection of portable terminal 70 and wireless communication device 40. Communication unit 52 is one example of an acquisition unit. Determination unit 54 determines, based on the acquired communication connection information, whether or not portable terminal 70 has moved from within the first predetermined range to out of the first predetermined range.

Such pickup request system 10 can determine the change in the position of portable terminal 70 based on the communication connection information acquired from portable terminal 70.

Moreover, for example, pickup request system 10 further includes communication unit 52 which acquires, from delivery box 20, package information indicating the presence or absence of the package in delivery box 20. Determination unit 54 determines the presence or absence of the package in delivery box 20 based on the acquired package information.

Such pickup request system 10 can determine the presence or absence of the package in delivery box 20 based on the package information provided from delivery box 20.

Moreover, for example, the package information is transmitted from delivery box 20 in accordance with a result of detecting the presence or absence of the package in delivery box 20 by detection unit 22 included in delivery box 20.

Such pickup request system 10 can determine the presence or absence of the package in delivery box 20 based on the package information transmitted from delivery box 20 in accordance with the result of the detection performed by detection unit 22.

Moreover, for example, the package information is transmitted from delivery box 20 in response to a press of the button included in delivery box 20.

Such pickup request system 10 can determine the presence or absence of the package in delivery box 20 based on the package information transmitted from delivery box 20 in response to the press of the button included in delivery box 20.

Moreover, with a pickup request method executed by a computer such as pickup request system 10, the presence or absence of the package in delivery box 20 provided on the site of building 80 and whether or not the user is present in building 80 are determined, and when it is determined that a change from the presence of the user to the absence thereof has occurred while the package is present in delivery box 20, the package pickup is requested.

Such a pickup request method provides the same effect as that provided by pickup request system 10.

Embodiment 2

[Operation]

Figure 8:
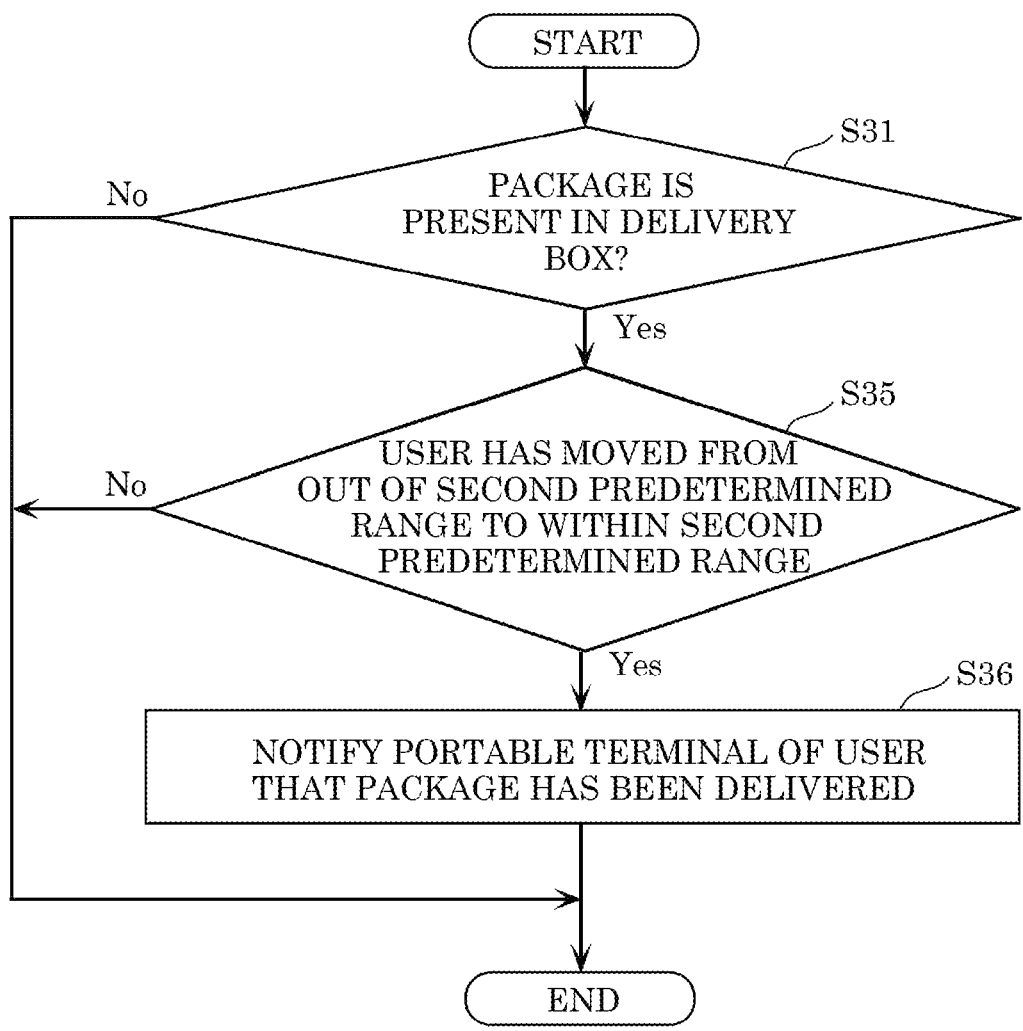
FIG. 8 is a flowchart of determination processing according to Embodiment 2.

When the package has been delivered to delivery box 20, pickup request system 10 can notify this fact. Embodiment 2 will be described, referring to detection processing for notifying that the package has been delivered. FIG. 8 is a flowchart of the determination processing according to Embodiment 2. Note that the overall operation in Embodiment 2 is substantially identical to that of FIG. 2 or 6 and a description thereof will be omitted.

First, determination unit 54 of information processing unit 51 determines the presence or absence of the package in delivery box 20 based on the acquired package information (S31). When it is determined that the package is present (Yes in S31), determination unit 54 determines whether or not the user has moved from out of a second predetermined range including at least part of building 80 to within the second predetermined range (S35). As a method for determining whether or not the user has moved from out of the second predetermined range to within the second predetermined range, any of the methods described in Embodiment 1 may be used.

Figure 9:
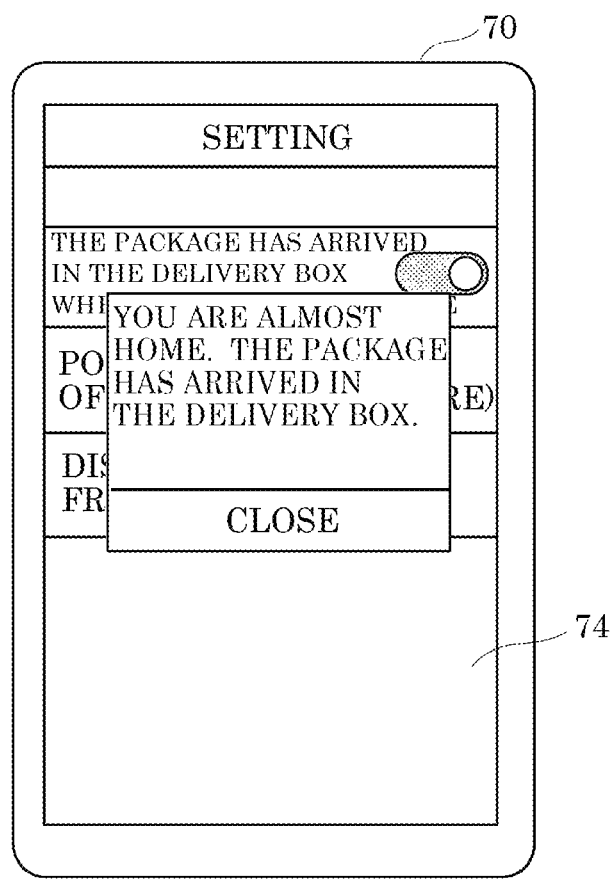
FIG. 9 is a diagram illustrating one example of a display screen notifying that a package has arrived.

When it is determined by determination unit 54 that the user has moved out of the second predetermined range to within the second predetermined range (Yes in S35), control unit 55 notifies portable terminal 70 of the user that the package has been delivered (S36). More specifically, control unit 55 causes communication unit 52 to perform notification. Display unit 74 of portable terminal 70 displays a display screen, as illustrated in FIG. 9, notifying that the package has arrived. FIG. 9 is a diagram illustrating one example of the display screen notifying that the package has arrived. The notification that the package has arrived is, for example, a push notification. The notification is not performed when it is not determined in step S35 that the user has moved out of the second predetermined range to within the second predetermined range (No in S35).

Moreover, the second predetermined range used for notifying the user that the package has arrived, which has been described in Embodiment 2, may be identical to or different from the first predetermined range used for requesting the pickup described in Embodiment 1. For example, the user can individually set the first predetermined range and the second predetermined range through the input screen displayed at display unit 74 of portable terminal 70.

Variations

Note that when the package in delivery box 20 has not been taken out although the notification has been performed in step S36 (that is, when the package information continuously indicates the presence of the package even after passage of predetermined time after step S36), notification can be performed again. Temporal limitation, such as notification which is performed only during a day when the package was deposited, may be put on the aforementioned re-notification.

Moreover, it is possible that delivery box 20 is shared by a plurality of users. More specifically, delivery box 20 may be provided in a house complex in some cases. In such cases, for example, as a result of receiving input operation of the room number from delivery staff by operation reception unit 21 of delivery box 20, delivery box 20 can acquire room number information. Transmitting such room number information to first server device 50 makes it possible for first server device 50 to specify the user (more specifically, portable terminal 70 of the aforementioned user) to which the notification is to be performed. In this case, for example, the room number of the user and the ID of portable terminal 70 of the user are previously stored in storage unit 53 through, for example, user registration.

Effects and Others

As described above, when it is determined that the user has moved from out of the second predetermined range including at least part of building 80 to within the second predetermined range while the package is present in delivery box 20, pickup request system 10 notifies portable terminal 70 of the user that the package has been delivered. Such pickup request system 10 can notify, upon arrival of the user at home, the user that the package has been delivered.

Other Embodiment

The embodiments have been described above but the present invention is not limited to the embodiments described above.

For example, another processing unit may execute the processing executed by the specific processing unit in the embodiments described above. For example, part or all of the determination processing performed by the first server device may be performed by the controller.

Moreover, the method for the communication between the devices in the embodiments described above is not specifically limited. Not only the wireless communication but also wired communication may be performed between the devices. Moreover, wireless communication and wired communication may be combined together between the devices. Moreover, when the two devices perform communication in the embodiments described above, a relay device, not illustrated, may be placed between the two devices.

Moreover, a sequence of the processes described in the flowchart of each embodiment described above is one example. The sequence of a plurality of processes may be changed or the plurality of processes may be executed in parallel.

Moreover, each component in the embodiments described above may be realized by executing a software program suitable for each component. Each component may be realized by reading out and executing a software program recorded on a recording medium such as a hard disc or a semiconductor memory by a program execution unit such as a CPU or a processor.

Moreover, each component may be realized by a hardware. For example, each component may be a circuit (or an integrated circuit). These circuits may be formed by one circuit as a whole or may be independent circuits. Moreover, each of these circuits may be a general-purpose circuit or a dedicated circuit.

Moreover, an overall or detailed mode of the present invention may be realized by a system, a device, a method, an integrated circuit, a computer program, or a recording medium such as a computer-readable CD-ROM. Moreover, the aforementioned mode may also be realized by combining together the system, the device, the method, the integrated circuit, the computer program, and the recording medium in a desired manner.

For example, the present invention may be realized as a pickup request method executed by a computer or may be realized as a program for causing a computer to execute such a pickup request method. Such a program includes an application program installed in a portable terminal such as a smartphone or a tablet terminal. Moreover, the present invention may be realized as a computer-readable non-transitory recording medium on which such a program is recorded.

Moreover, the pickup request system may be realized as a single device or may be realized by a plurality of devices. When the pickup request system is realized by the plurality of devices, components included in the pickup request system may be allocated to the plurality of devices in any manner.

In addition, the present invention also includes: a mode obtained by making various modifications conceivable by those skilled in the art to each of the embodiments; and a mode realized by combining together the components and the functions in each embodiment in a desired manner within a range not departing from the spirits of the present invention.

REFERENCE MARKS IN THE DRAWINGS 10 pickup request system
20 delivery box
40 wireless communication device
52 communication unit (acquisition unit)
54 determination unit
55 control unit
70 portable terminal
80 building

The invention claimed is:

1. A pickup request system, comprising:
a determination unit configured to determine presence or absence of a package in a delivery box provided on a site of a building and whether or not a user is present in a first predetermined range including the building; and
a control unit configured to request pickup of the package when it is determined that the user has moved from within the first predetermined range to out of the first predetermined range while the package is present in the delivery box.

2. The pickup request system according to claim 1,
wherein the determination unit is configured to determine, based on a position of a portable terminal of the user, whether or not the user has moved from within the first predetermined range to out of the first predetermined range.

3. The pickup request system according to claim 2, further comprising
an acquisition unit configured to acquire current position information of the portable terminal from the portable terminal,
wherein the determination unit is configured to determine, based on the current position information acquired, whether or not the portable terminal has moved from within the first predetermined range to out of the first predetermined range.

4. The pickup request system according to claim 2,
wherein the first predetermined range is a range over which a wireless communication device provided in the building is capable of wireless communication, and
the determination unit is configured to determine, based on a state of communication connection of the portable terminal and the wireless communication device, whether or not the portable terminal of the user has moved from within the first predetermined range to out of the first predetermined range.

5. The pickup request system according to claim 4, further comprising
an acquisition unit configured to acquire, from the portable terminal, communication connection information indicating a state of the communication connection of the portable terminal and the wireless communication device,
wherein the determination unit is configured to determine, based on the communication connection information acquired, whether or not the portable terminal has moved from within the first predetermined range to out of the first predetermined range.

6. The pickup request system according to claim 1, further comprising
an acquisition unit configured to acquire, from the delivery box, package information indicating the presence or absence of the package in the delivery box,
wherein the determination unit is configured to determine, based on the package information acquired, the presence or absence of the package in the delivery box.

7. The pickup request system according to claim 6,
wherein the package information is transmitted from the delivery box in accordance with a result of detecting the presence or absence of the package in the delivery box by a detection unit included in the delivery box.

8. The pickup request system according to claim 6,
wherein the package information is transmitted from the delivery box in response to a press of a button included in the delivery box.

9. The pickup request system according to claim 1,
wherein the control unit is configured to, when it is determined that the user has moved from out of a second predetermined range including the building to within the second predetermined range while the package is present in the delivery box, notify a portable terminal of the user that the package has been delivered.

10. A pickup request method executed by a computer, the pickup request method comprising:
determining presence or absence of a package in a delivery box provided on a site of a building and whether or not a user is present in the building; and
requesting pickup of the package when it is determined that a change from presence of the user to absence of the user has occurred while the package is present in the delivery box.

11. A computer-readable, non-transitory recording medium on which a program for causing a computer to execute the pickup request method according to claim 10 is recorded.

* * * * *